A. G. LUNDIN.
HORSESHOE.
APPLICATION FILED APR. 28, 1911. RENEWED SEPT. 6, 1912.

1,044,550. Patented Nov. 19, 1912.

Witnesses.
Franklin E. Low.
Sydney E. Taft.

Inventor:
Andres G. Lundin,
by his attorney,
Charles S. Gooding.

COLUMBIA PLANOGRAPH CO., WASHINGTON, D. C.

UNITED STATES PATENT OFFICE.

ANDRES G. LUNDIN, OF NEPONSET, MASSACHUSETTS.

HORSESHOE.

1,044,550.

Specification of Letters Patent. Patented Nov. 19, 1912.

Application filed April 28, 1911, Serial No. 623,807. Renewed September 6, 1912. Serial No. 719,005.

*To all whom it may concern:*

Be it known that I, ANDRES G. LUNDIN, a citizen of the United States, residing at Neponset, in the county of Suffolk and State of Massachusetts, have invented new and useful Improvements in Horseshoes, of which the following is a specification.

This invention relates to improvements in horseshoes and particularly to a special class of horseshoes having detachable calks, and has for its object to provide novel calks which may be conveniently removed when worn and replaced by new ones without removing the shoe from the horse's hoof, thus enabling the calks to be renewed from time to time without the services of a blacksmith.

To this end, my invention consists in the novel features of construction and in the combination and arrangement of parts set forth in the following specification and particularly pointed out in the claims.

Figure 1:
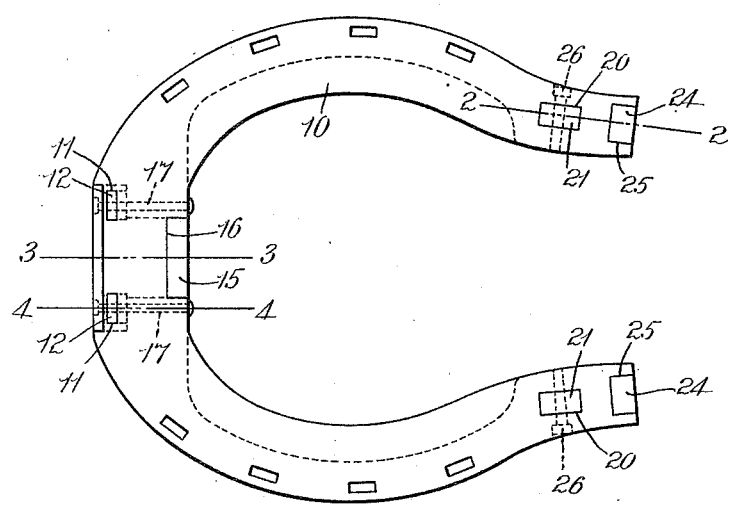
Figure 2:
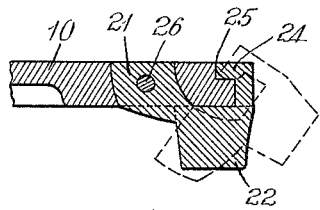
Figure 3:
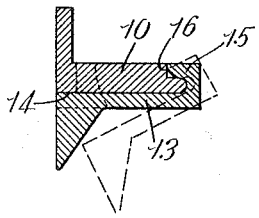
Figure 4:
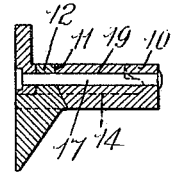
Figure 5:
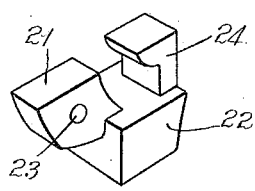
Figure 6:
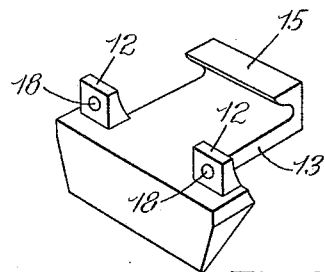

Referring to the drawings: Figure 1 is a top plan of a horseshoe embodying my invention. Fig. 2 is an enlarged detail sectional view taken on line 2—2 of Fig. 1. Fig. 3 is an enlarged detail sectional view taken on line 3—3 of Fig. 1. Fig. 4 is an enlarged detail sectional view taken on line 4—4 of Fig. 1. Fig. 5 is a perspective view of one of the heel calks. Fig. 6 is a perspective view of the toe calk.

Like numerals refer to like parts throughout the several views of the drawings.

In the drawings, 10 is a tread-piece which may be of any usual or desired form and which is provided at its toe portion with two perforations 11, 11 which receive lugs 12, 12 of a toe calk 13, the body portion of which is located in a recess 14 provided in the under side of the tread piece 10. The toe calk 13 is fulcrumed at its rear end upon the tread-piece 10 preferably by providing said toe calk with a hook 15 and by providing said tread-piece with a recess 16 suitably shaped to receive said hook. The hook 15 and the lugs 12 are suitably shaped so that the calk may be swung from the position which it normally occupies, as shown in full lines in Figs. 3 and 4, into the dotted line position shown in Fig. 3.

The lugs 12 are normally held in their respective perforations 11 in the tread-piece 10 by suitable means preferably consisting of pins, rivets or the like 17, 17 passing through perforations 18, 18 provided in said lugs and through holes 19, 19 provided in the tread-piece 10. Thus the calk is normally held firmly in place and yet may be quickly and conveniently removed by removing the pins 17 and swinging the calk from its normal position into the position shown in dotted lines in Fig. 3, whereupon it may be withdrawn rearwardly from interengagement with the tread-piece 10.

The heel portions of the tread-piece 10 are provided, respectively, with perforations 20, 20 which receive lugs 21, 21 provided on heel calks 22, 22, these lugs being provided, respectively, with perforations 23, 23 and being held in place in the perforations 20, 20, respectively, by suitable means such, for example, as pins, rivets or the like 26, 26. Each of the heel calks 22 is fulcrumed at its rear end upon the tread-piece 10 preferably by providing each calk with a hook 24 located in a suitably shaped recess 25 provided in the tread-piece 10. The form of the hook 24 and the form of the lug 21 is such that the calk 22 may be swung upon the hook 24 as a fulcrum from its normal position shown in full lines in Fig. 2 to the position shown in dotted lines therein and may then be withdrawn rearwardly from interengagement with the tread-piece. It will thus be seen that the heel calks are normally firmly secured in place so as to resist all of the usual strains to which they are subjected and yet may be quickly and conveniently removed by removing the pins 26 and swinging the calks upon their respective hooks so as to withdraw the lugs 21 from their respective perforations 20. Since the lugs of the calks are located forward of their respective hooks, it will be evident that the action of the horse in pulling a load tends to force the lugs into their respective holes and hold them firmly in place, thus taking the strain off of the pins which hold the lugs in their respective holes, this result, of course, being possible only where the fulcrum is located at the rear of the hole.

All of the parts may be easily manufactured by casting the same of steel in cast-iron molds otherwise known as chills so that the parts which fit each other will be smoothly and accurately formed without the necessity of being finished in any way for being assembled and it will, therefore, be apparent that the user may be supplied with a number of toe and heel calks which will be interchangeable and will thus permit replacement of worn calks in a few moments' time by a comparatively unskilled person.

Having thus described my invention, what I claim and desire by Letters Patent to secure is:

1. A horseshoe having, in combination, a tread-piece provided with a recess in its under side and a perforation leading upwardly from said recess at its forward portion, a calk having its body portion located in said recess provided with a hook interengaging with said tread-piece at the rear of said hole and provided with a lug located in said perforation, and means to secure said lug in said perforation.

2. A horseshoe having, in combination, a tread-piece provided with a perforation and provided at the rear of said perforation with a recess extending upwardly and thence forwardly toward said perforation, a calk having a hook extending upwardly in said recess and thence forwardly in said recess toward said perforation, said calk having a lug extending upwardly into said perforation, and means to secure said lug in said perforation.

3. A horseshoe having, in combination, a tread-piece provided in its under side with a recess, a perforation extending upwardly from said recess, and another recess extending upwardly from the first-mentioned recess and thence forwardly toward said perforation; a calk having its body portion located in the first-mentioned recess, a hook extending upwardly in the second-mentioned recess and thence forwardly therein toward said perforation and a lug extending upwardly from said body portion into said perforation, and means to secure said lug in said perforation.

4. A horseshoe having, in combination, a tread-piece provided with a perforation, a calk having one end fulcrumed on said tread-piece and provided with a lug located in said perforation, said lug being formed on that side which is toward the fulcrum, substantially on an arc struck from said fulcrum.

5. A horseshoe, having in combination, a tread-piece provided with a perforation, a calk having one end fulcrumed on said tread-piece and provided with a lug located in said perforation, said lug having its front and rear sides converging upwardly within said perforation.

In testimony whereof I have hereunto set my hand in presence of two subscribing witnesses.

ANDRES G. LUNDIN.

Witnesses:
LOUIS A. JONES,
SADIE V. MCCARTHY.

Copies of this patent may be obtained for five cents each, by addressing the "Commissioner of Patents, Washington, D. C."